(12) United States Patent
Graham et al.

(10) Patent No.: US 10,719,421 B2
(45) Date of Patent: Jul. 21, 2020

(54) DATA STORAGE DEVICE MONITORING

(71) Applicant: HEWLETT-PACKARD DEVELOPMENT COMPANY, L.P., Houston, TX (US)

(72) Inventors: Christoph J Graham, Houston, TX (US); Thomas J Flynn, Houston, TX (US); Virginia Q Herrera, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 10 days.

(21) Appl. No.: 15/757,385

(22) PCT Filed: Oct. 23, 2015

(86) PCT No.: PCT/US2015/057134
§ 371 (c)(1),
(2) Date: Mar. 5, 2018

(87) PCT Pub. No.: WO2017/069775
PCT Pub. Date: Apr. 27, 2017

(65) Prior Publication Data
US 2018/0253366 A1 Sep. 6, 2018

(51) Int. Cl.
*G06F 11/30* (2006.01)
*G06F 11/34* (2006.01)
*H04L 12/24* (2006.01)
*H04L 12/26* (2006.01)
*G06F 11/00* (2006.01)

(52) U.S. Cl.
CPC .......... *G06F 11/3034* (2013.01); *G06F 11/30* (2013.01); *G06F 11/3409* (2013.01);
(Continued)

(58) Field of Classification Search
CPC .... G06F 11/008; G06F 11/30; G06F 11/3034; G06F 11/3409; G06F 11/3452;
(Continued)

(56) References Cited

U.S. PATENT DOCUMENTS 8,499,116 B2 * 7/2013 Roberts ............... G06F 12/0246
711/103
8,499,132 B1 * 7/2013 Pasupathy ............... G06F 3/061
711/165

(Continued)

FOREIGN PATENT DOCUMENTS

TW   200532524   10/2015

OTHER PUBLICATIONS

"MaxView Storage Manager User's Guide", May 15, 2014.
User's Guide ADATA SSD, Jan. 27, 2014.

*Primary Examiner* — Gil H. Lee
(74) *Attorney, Agent, or Firm* — Rathe Lindenbaum LLP

(57) ABSTRACT

An example method for monitoring different data storage devices across a network includes receiving data storage access requests made to different data storage devices across a network. A subset of the access requests to a taxon of a taxonomy of access request characteristics. For the taxon, a taxon threshold is determined for a parameter based upon the subset of access requests. The parameter of a sample of observed access requests, made to a data storage device and belonging to the taxon, is compared to the taxon threshold. A notification regarding the data storage device is made based upon the comparison.

16 Claims, 7 Drawing Sheets

(52) U.S. Cl.
CPC .............. *H04L 41/06* (2013.01); *H04L 43/08* (2013.01); *H04L 43/16* (2013.01); *G06F 11/008* (2013.01); *G06F 11/3452* (2013.01); *G06F 11/3485* (2013.01)

(58) Field of Classification Search
CPC .. G06F 11/3485; G06F 2201/81; H04L 41/06; H04L 63/08; H04L 63/16
See application file for complete search history.

(56) References Cited

U.S. PATENT DOCUMENTS

| | | |
|---|---|---|
| 8,825,937 B2 | 9/2014 | Atkisson et al. |
| 8,954,654 B2 | 2/2015 | Yu et al. |
| 9,037,826 B1 * | 5/2015 | Brooker .................. G11C 7/22 711/167 |
| 9,153,331 B2 | 10/2015 | D'Abreu et al. |
| 2005/0091369 A1 * | 4/2005 | Jones ..................... H04L 41/06 709/224 |
| 2011/0138127 A1 * | 6/2011 | Ben-Yehuda ........... G06F 12/08 711/128 |
| 2012/0170435 A1 | 7/2012 | Trantham |
| 2013/0179624 A1 | 7/2013 | Lambert et al. |
| 2014/0013028 A1 | 1/2014 | Rametta |
| 2014/0181430 A1 | 6/2014 | Bruso et al. |
| 2015/0234715 A1 | 8/2015 | Coronado |
| 2015/0269017 A1 * | 9/2015 | Ellis ................... G06F 11/0793 714/42 |
| 2016/0092109 A1 * | 3/2016 | Wu ........................ G06F 3/061 711/114 |

* cited by examiner

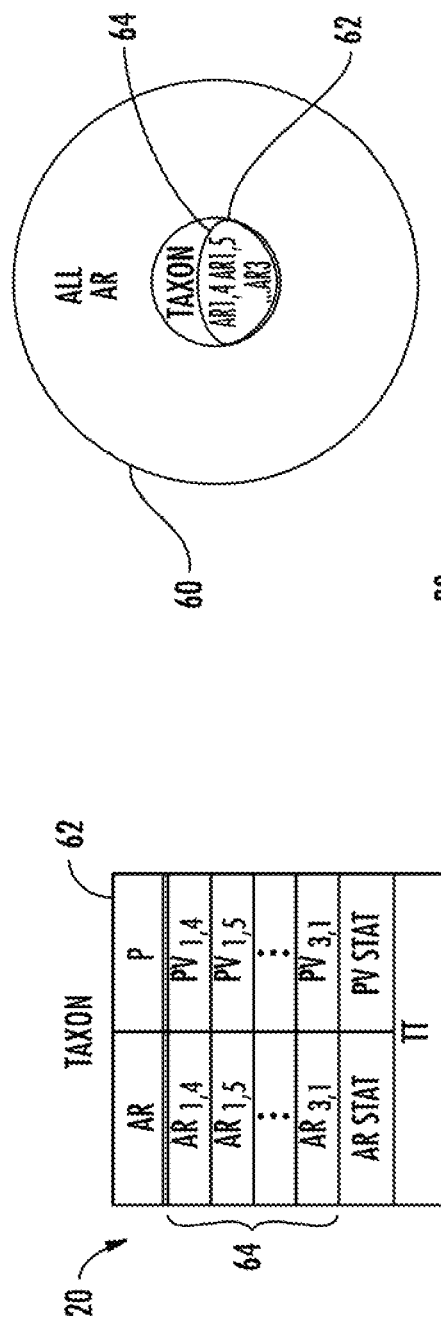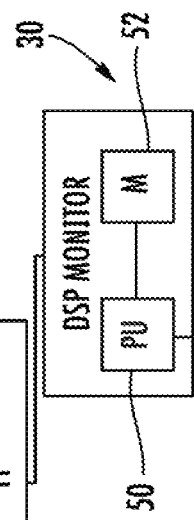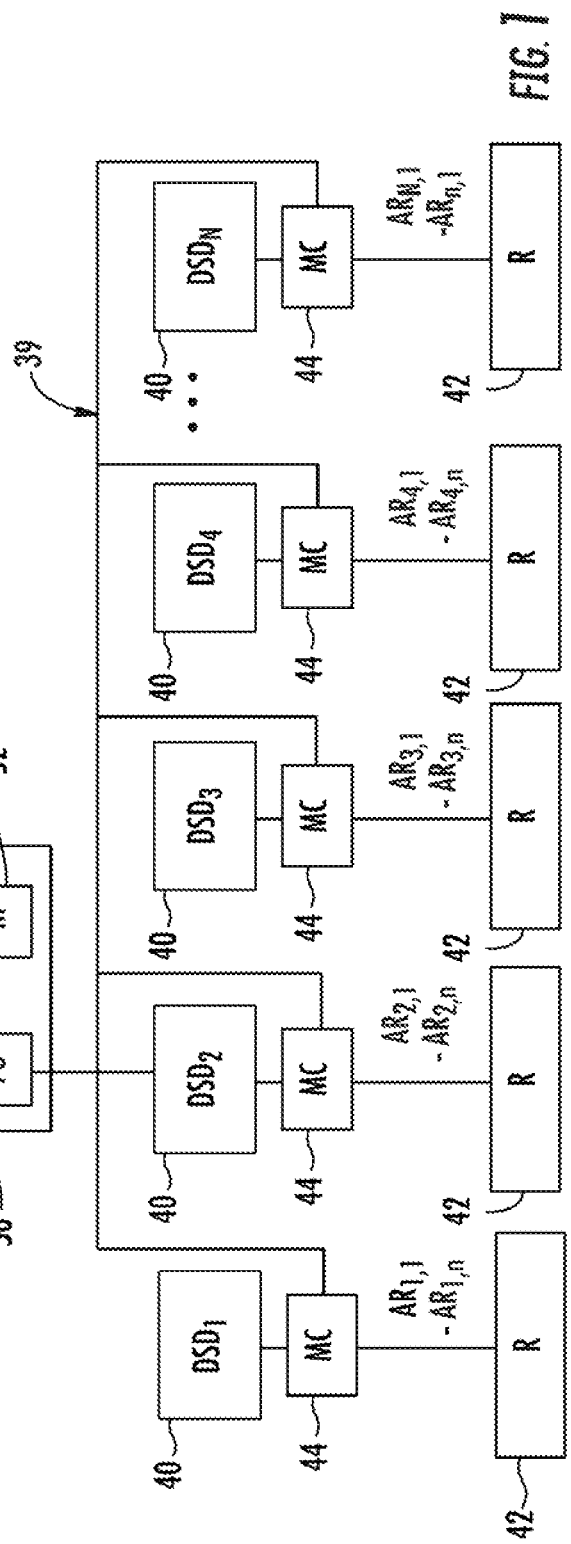
FIG. 1
FIG. 2

DATA STORAGE DEVICE MONITORING

BACKGROUND

Data storage devices are used to store data. Access requests to the data storage device to read data from the data storage device and to write data to the storage device may wear a data storage device, leading to eventual failure of the data storage device.

BRIEF DESCRIPTION OF THE DRAWINGS

FIG. 1 is a schematic diagram of an example data storage device monitoring system.

FIG. 2 is a diagram of an example taxon of a taxonomy of access requests.

DETAILED DESCRIPTION

Figure 3:
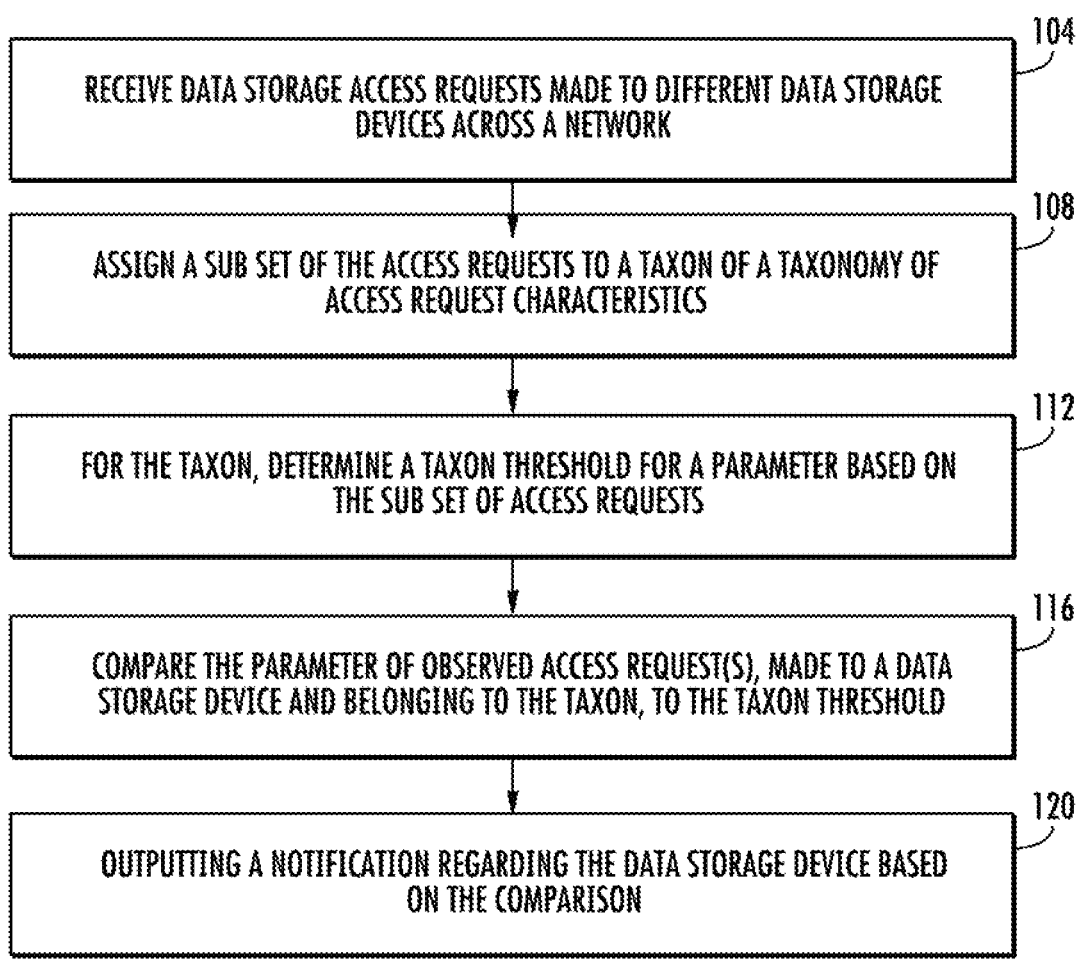
FIG. 3 is a flow diagram of an example data storage device monitoring method.

Access requests that either read data from a data storage device or write data to the data storage device impose wear upon the data storage device. Measuring and tracking wear of an individual data storage device is often difficult. Depending upon variations in their use, different data storage devices may wear at different rates. An unexpected failure of a data storage device may lead to a loss of data.

FIG. 1 schematically illustrates an example data storage device monitoring system 20. As will be described hereafter, data storage device monitoring system 20 monitors the wear imposed upon a data storage device. Monitoring system 20 compares a parameter of access requests, made to the data storage device and belonging to a particular taxon of access requests to a threshold for the parameter that has been derived from access requests to multiple data storage devices across a network and assigned to the same taxon. Based upon the comparison, monitoring system 20 outputs a notification regarding the state of wear of the particular data storage device and potential failure concerns.

Data storage device monitoring system 20 comprises data storage device monitor 30 which receives data storage access requests or information regarding such access requests from made to different data storage devices 40 across a network. In the example illustrated, data storage device monitoring system 20 receives data storage access requests or information regarding such access requests that are being made to data storage devices 40 ($DSD_1$-$DSD_N$). Such data storage devices 40 may comprise solid-state storage devices such as NAND-type flash memory devices. In other implementations, memory storage devices 40 may comprise other types of data storage devices or memory devices.

In the example illustrated, access requests AR, also referred to as input/output requests or read/write requests, are made to each data storage device 40 by a requester 42 (R). Each requester 42 may comprise any of a variety of requesters, such as a central processing unit of the computing device. In the example illustrated, such requests are transmitted to an intervening memory controller 44 which may manage the writing of data to and reading of data from the associated data storage device 40. In the example illustrated, in addition to transmitting the access requests to the associated data storage device 40, memory controllers 44 further transmit the access requests data regarding the access requests, to monitor 30. In the example illustrated, access request made to an individual data storage device DSD comprise access requests $AR_{x,y}$, where the first subscript denotes a particular data storage device and where the second subscript denotes an identification of the individual access request. For example, access requests made to $DSD_1$ comprise access requests $AR_{1,1}$ to $AR_{1,n}$. In other implementations, monitor 30 may retrieve or obtain the access requests AR made to the different data storage devices 40 across the network or information regarding the access requests AR made to the different data storage devices across the network from other sources. For example, access requests for their associated information may be transmitted directly from requester 42 to both the memory controller 44 and monitor 30

Data storage device monitor 30 comprises processing unit (PU) 50 and memory 52. Processing unit 50 follows instructions provided by memory 52, a non-transitory computer-readable medium. For purposes of this application, the term "processing unit" shall mean a presently developed or future developed processing unit that executes sequences of instructions contained in a memory, such as memory 52. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, monitor 30 may be embodied as part of one or more application-specific integrated circuits (ASICs). Unless otherwise specifically noted, the controller is not limited to any specific combination of hardware circuitry and software, nor to any particular source for the instructions executed by the processing unit.

Memory 52 comprises a non-transient computer-readable medium containing instructions that direct processing unit 50 to carry out the example data storage device monitoring method 100 illustrated in FIG. 3. As indicated by block 104 in FIG. 3, memory 52 directs processing unit 50 to receive or otherwise obtain data storage access requests AR made two different data storage devices DSD 40 across a network. As described above, in one implementation, monitor 30 obtains the data storage access requests AR from the memory controller associated with each data storage device 40. In other implementations, monitor 30 may acquire the data storage access requests from other sources.

As indicated by block 108 in FIG. 3, memory 52 directs processing unit 50 to assign a subset of received access requests to a taxon of a taxonomy of access request characteristics. FIG. 2 illustrates the universe or entire population 60 of access requests received by monitor 30 from the various data storage devices 40. Out of this population of access requests 60, monitor 30 maintains a defined taxon 62 of an overall taxonomy of access request characteristics. Taxon 62 comprises an individual level of a hierarchy of multiple levels of access request characteristics, each level or taxon 62 comprising a particular set of predefined characteristics associated with individual access requests. Taxon 62 may be based upon characteristics of an access request such as characteristics of the requester 42 from which the access request originated, characteristics of the program or application being carried out by the requester and for which the access request is made, characteristics with respect to the time that the access request was made and the like. For example, different access requests from different requesters 42 may be assigned to different taxons 62 based upon some different characteristic of the different requesters. Access requests initiated during the running of a first program or type program or application may be assigned to first taxon while access requests initiated during the running of a second program or second type of program or application may be assigned to a second different taxon. Access requests made during a first time of day, day of the week, month of the year or other time period may be assigned to a first taxon while other access requests made during a different time the day, different day of the week, a different month of the year or a different other time may be assigned to a second different taxon. The subset of the population 60 of access requests AR that fall within the defined boundaries or characteristics of the taxon 62 are assigned to the particular taxon 62. In the example illustrated, access requests $AR_{1,4}$, $AR_{1,5} \ldots AR_{3,1}$ are assigned to taxon 62, each of such access requests AR having characteristics falling within the defined characteristic boundaries or ranges of taxon 62.

As indicated by block 112 of FIG. 3, for the taxon, such as taxon 62, memory 52 directs processing unit 50 to determine a taxon threshold for a parameter based upon the subset of access requests assigned to the taxon. In the example illustrated in FIG. 1, for each access request of the subset of access requests, monitor 30 determines or identifies values PV for a particular parameter P of the particular access request AR. Examples of parameters of access requests for which monitor 30 may determine or identify values include, but are not limited to, a frequency at which access requests received during a time period in which a particular access request was received or quantity of data being transferred (read or written) pursuant to the individual access request.

As further shown by FIG. 1, for the particular parameter P, memory 52 directs processing unit 50 to determine an aggregate statistical value $PV_{stat}$ based upon the individual parameter values for the individual access requests. For example, monitor 30 may determine a mean or average of the various frequencies at which the access requests were made. Monitor 30 may determine a mean or average of the quantity of data transferred pursuant to the subset of access requests belonging to taxon 62. Based upon the determined $PV_{stat}$, monitor 30 (pursuant to the instructions contained in memory 52, determines an initial or new taxon threshold (TT) or adjusts an existing taxon threshold (TT). For example, in one implementation, a taxon threshold TT may be defined as a value falling outside of one standard deviation from the average or mean value ($PV_{stat}$) for the parameter P of subset 54 of access assigned to taxon 62.

In one implementation, the taxon threshold TT for the taxon 62 is determined based upon access requests made during an initial set up stage for monitor 30. In another implementation, the taxon threshold TT for the taxon 62 is determined based upon access requests made at predefined time intervals are periodic time intervals, where a new determined taxon threshold TT replaces an old taxon threshold TT at each time interval. In yet another implementation, the taxon threshold TT is continuously revised in real time as new access requests are made for different data storage devices 40 and received by monitor 30, in one implementation, the $PV_{stat}$ value used as a basis for determining the taxon threshold TT is based upon a predefined set of access requests assigned to the taxon 62, where as new access requests are received belonging to taxon 62 and are added to the predefined set used to determine the $PV_{stat}$ value, older access requests are removed or ejected from the predefined set. In one implementation, older access requests belonging to taxon 62 and previously used to determine the $PV_{stat}$ value from which the taxon threshold is based, or ejected or removed from the predefined set on a first in first out basis. In other implementations, the particular access requests in their associated parameter values PV be added to the predefined set and removed from the predefined set according to other protocols.

In one implementation, monitor 30 determines or calculates the $PV_{stat}$ value, from which the taxon threshold is determined, by applying a weighting to the different parameter values PV for the different access requests AR. In one implementation, monitor 30 differently weights the parameter values PV based upon the age of the associated access request AR. For example, in one implementation, the parameter values of older access requests are given a lower weight as compared to the parameter values of newer more recently received access requests. In yet another implementation, monitor 30 may differently weight the parameter values of different access requests based upon other characteristics of the access requests such as the particular data storage device to which the access request was directed, the time of day that an access request was received, the requester from which the access request originated and/or the program or application for which the access request is being made.

As indicated by block 116 of FIG. 3, monitor 30 monitors the health or wear of data storage devices 40 by observing a sample of access requests made to the individual data storage devices. Monitor 30 compares the parameter of the sample of observed access requests made to a data storage device and belonging to the taxon 62, to the taxon threshold TT to identify whether the data storage device is an outlier with respect to other data storage devices. For example, upon receipt of an access request or a group of access requests to an individual data storage device, monitor 30 identifies or determines the value for the parameter for which the taxon threshold was determined in block 112. In the case where the sample of observed access requests comprises multiple access requests, monitor 30 may determine an average or other statistical value based upon the multiple access requests of the sample.

As noted above, in one implementation, the parameter being evaluated comprises the frequency, of receipt of access requests during the time. In which the individual access request to the individual data storage device was made. In another implementation, the parameter being measured may comprise a quantity of the data transferred (read or written) pursuant to the access request. Monitor 30 compares the value of the access request or group of access requests to the taxon threshold TT.

As indicated by block 118 of FIG. 3, based upon the comparison of the parameter of the observed access requests and the current taxon threshold TT, monitor 30 outputs a notification. The notification may vary depending upon the boundaries of the taxon 62. In one implementation, the notification may alert a user or owner of the data storage device, an information technology department or other manager that the particular data storage device is undergoing abnormal rates of wear, possibly indicating unauthorized extraneous use of the data storage device. In another implementation, the notification may alert a user or owner of the data storage of device, information technology department or other manager that the particular data storage device may be approaching a time of failure such that more frequent backups or a possible replacement of the data storage device should be considered. In yet other implementations, the notification may alert a user or owner of the data storage of device, information technology department or other manager that the particular data storage device is being underutilized, that it is wearing at a much slower rate than average or normal as compared to other similarly used data storage devices. In such a circumstance, the alert may suggest or lead to use of the data storage device being rotated or switch with other data storage devices having heavier wear to facilitate load or wear balancing amongst a group of data storage devices. It still other implementations, the notification may automatically trigger a memory controller 44 or access requester 42 to store new data with alternative data storage devices of a network, reducing wear of the data storage device identified as being at risk based upon the comparison in block 116.

In one implementation, the monitoring of multiple data storage devices 40 by monitor 30 is performed in real time and performed automatically. In one implementation, monitor 30 concurrently monitors hundreds and even thousands of different data storage devices 40, constantly and continuously updating or adjusting the taxon threshold TT as streams of access requests are continuously received. Such access requests may be streaming in at rates of hundreds or even thousands of access requests per second. Monitor 30 facilitates real-time monitoring of such access requests to identify aberrations that may indicate out of the ordinary use, wear or performance of individual data storage devices. As a result, the performance of the individual data storage devices may be improved.

Figure 4:
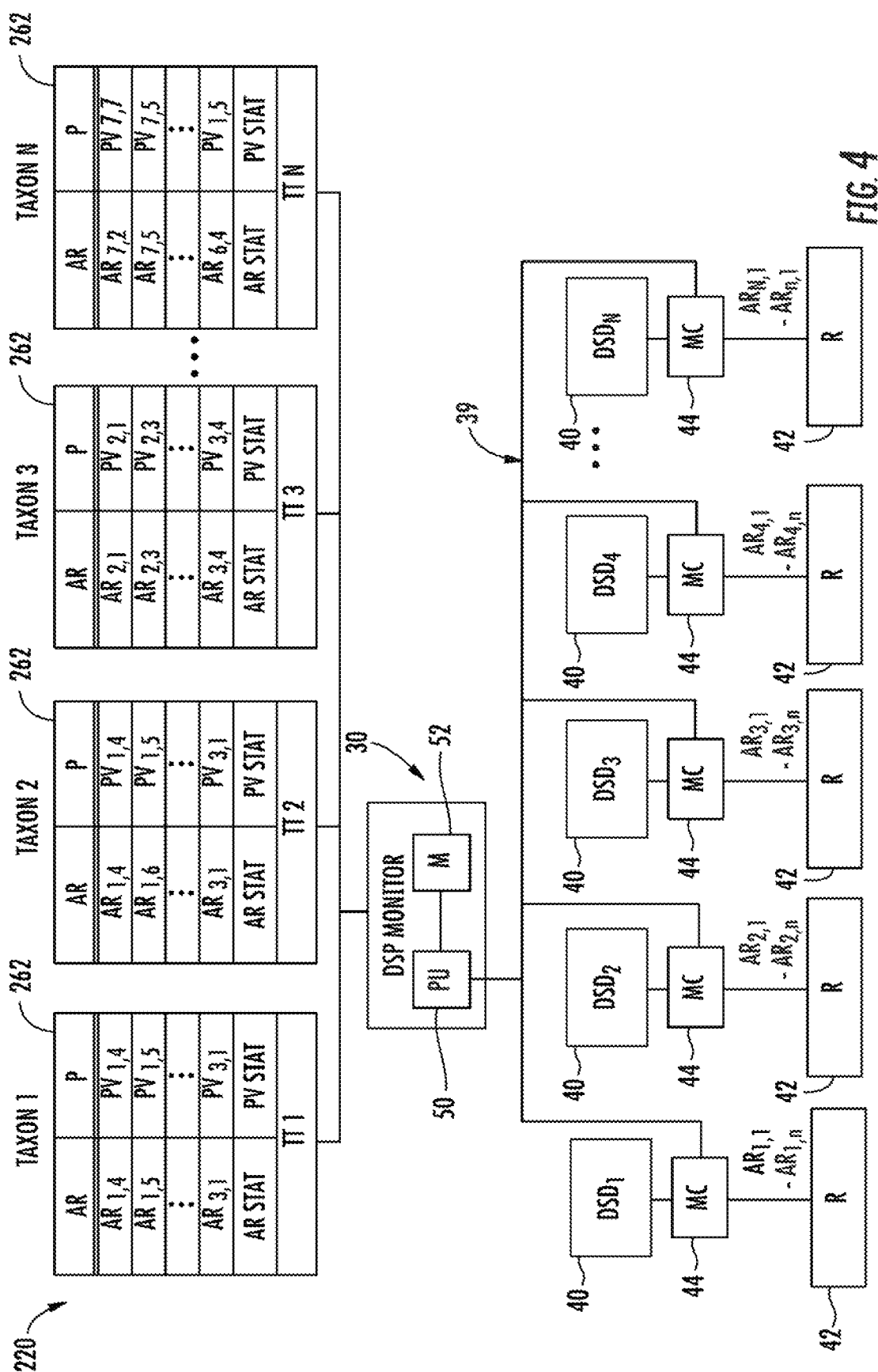
FIG. 4 is a schematic diagram of another example data storage device monitoring system.

FIG. 4 schematically illustrates data storage device monitoring system 220, an example implementation of data storage device monitoring system 20. Data storage device monitoring system 220 is similar to data storage device monitoring system 20 except that system 220 is specifically illustrated as monitoring data storage devices based upon or through the use of multiple different taxons. Those remaining components or elements of system 220 which correspond to components or elements of system 20 are numbered similarly.

As shown by FIG. 4, monitor 30 assigns data storage access requests AR to taxons 262, taxon 1, taxon 2, taxon 3 . . . taxon N. Each of taxons 1-N comprises an individual level of a hierarchy of multiple levels of access request characteristics, each level or taxon 262 comprising a particular set of predefined characteristics associated with individual access requests. Each of taxons 262 may be based upon characteristics of an access request such as characteristics of the requester 42 from which the access request originated, characteristics of the program or application being carried out by the requester and for which the access request is made, characteristics with, respect to the time that the access request was made and the like. For example, different access requests from different requesters 42 may be assigned to different taxons 262 based upon some different characteristic of the different requesters Access requests initiated during the running of a first program or type program or application may be assigned to first taxon while access requests initiated during the running of a second program or second type of program or application may be assigned to a second different taxon. Access requests made during a first time of day, day of the week, month of the year or other time period may be assigned to a first taxon while other access requests made during a different time the day, different day of the week, a different month of the year or a different other time period be assigned to a second different taxon. The subset of the population of access requests AR that fall within the defined boundaries or characteristics of the taxon 262 are assigned to the particular axon 262.

In many cases, an individual access request may belong to multiple taxons. For example, taxon 262 may comprise a first taxon which is a genus taxon to multiple second taxons which are species of the first taxon. In some circumstances, an individual access request may belong to a species taxon 262 and therefore also belong to the genus taxon 262. FIG. 4 illustrates an example assignment of different subsets of access requests AR to the different taxons 262. In the example illustrated, access request $AR_{1,4}$ (the fourth access request made to data storage device DSD1) is illustrated as being assigned to both taxon 1 and taxon 2.

As further shown by FIG. 4, for each taxon 262, monitor 30 obtains parameter values associated with the access requests belonging to the particular taxon, calculates and determines a parameter value statistic based upon the parameter values of the subset of access requests assigned to the individual taxon and determines a taxon threshold based upon the parameter value statistic as described above respect to block 112 of method 100. As a result, each taxon may have a different taxon threshold for parameter P.

In one implementation, the parameter P of each of taxon 262 is the same, where the parameter values that and the taxon threshold for the different taxons 262 may still be different due to the different access requests (and their associated parameter values) assigned to the different taxons 262. In another implementation, some of taxons 262 may have different parameters P, where the taxon threshold will be based upon a parameter value statistic for the values of the different parameter P for example, in one implementation, one taxon may utilize a parameter P comprising the quantity of data transferred to an access request while another taxon may utilize the parameter P comprising a frequency of access requests during a time period in which an individual access request was received.

The determined taxon threshold of the different taxons are stored as part of a database contained in memory 52 or stored in a remotely located database. As with system 20, in one implementation, monitor 30 continuously and repeatedly updates the taxon thresholds for each taxon 262 as new access requests are made to the different data storage devices 40 across the network 39. In one implementation, the taxon threshold TT for each of taxons 262 is determined based upon access requests made at predefined time intervals are periodic time intervals, where a new determined taxon threshold TT replaces an old taxon threshold TT at each time interval. In yet another implementation, the taxon threshold TT is continuously revised in real time as new access requests are made for different data storage devices 40 and received by monitor 30. In one implementation, the PVstat value used as a basis for determining the taxon threshold TT is based upon a predefined set of access requests assigned to a particular taxon 262, where as new access requests are received belonging to the particular taxon 262 and are added to the predefined set used to determine the PVstat value, older access requests are removed or ejected from the predefined set. In one implementation, older access requests belonging to the particular taxon 262 and previously used to determine the PVstat value from which the taxon threshold is based, or ejected or removed from the predefined set on a first in first out basis. In other implementations, the particular access requests in their associated parameter values PV be added to the predefined set and removed from the predefined set according to other protocols.

In one implementation, monitor 30 determines or calculates the PVstat value, from which the taxon threshold is determined, by applying a weighting to the different parameter values PV for the different access requests AR. In one implementation, monitor 30 differently weights the parameter values PV based upon the age of the associated access request AR. For example, in one implementation, the parameter values of older access requests are given a lower weight as compared to the parameter values of newer more recently received access requests. In yet another implementation, monitor 30 may differently weight the parameter values of different access requests based upon other characteristics of the access requests such as the particular data storage device to which the access request was directed, the time of day that an access request was received, the requester from which the access request originated and/or the program or application for which the access request is being made.

Figure 5:
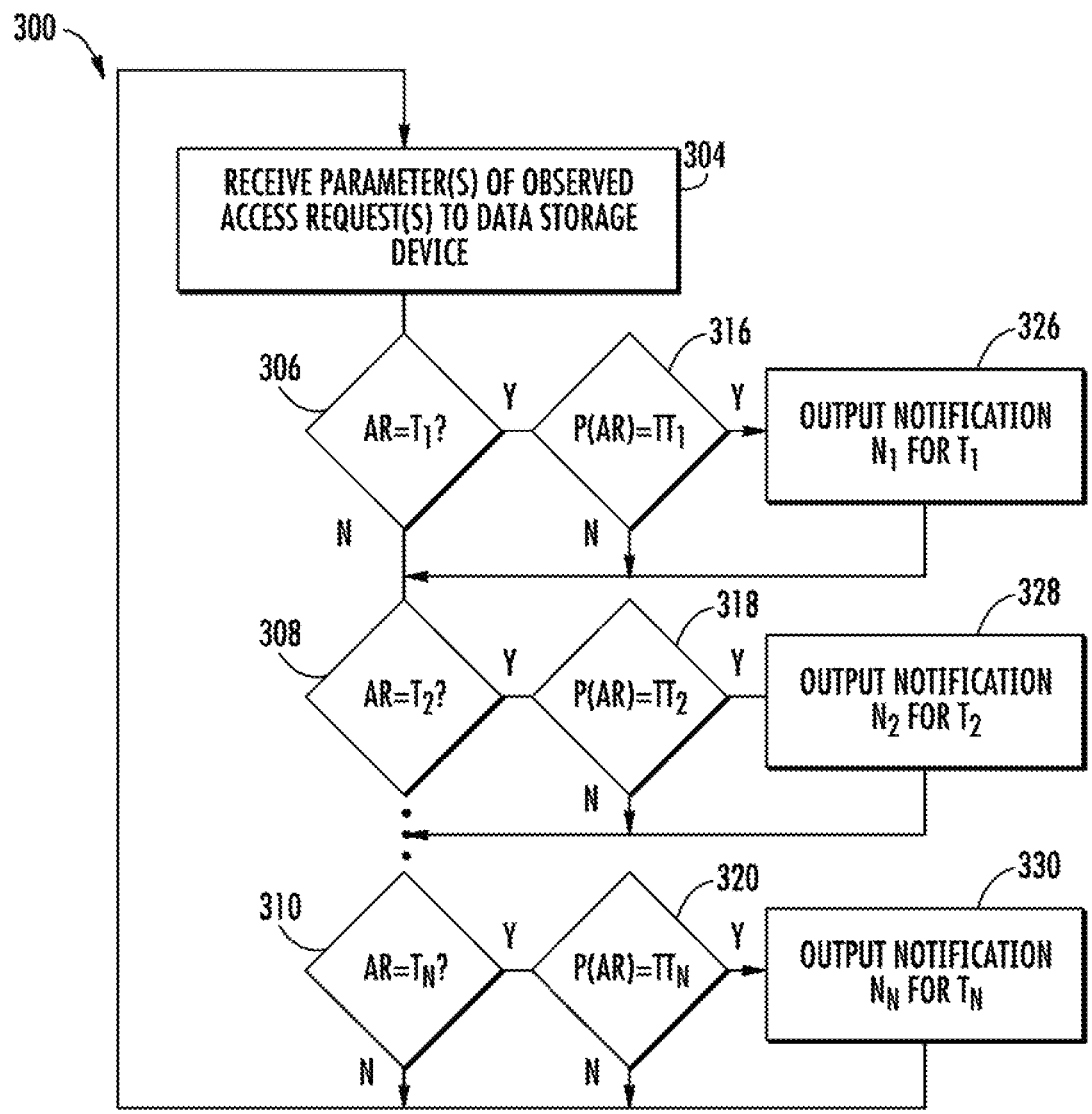
FIG. 5 is a flow diagram of another example data storage device monitoring method.

FIG. 5 illustrates an example data storage device monitoring method 300 that may be carried out by system 220. Pursuant to method 300, parameter values of a sample of observed access requests being made to a data storage device 40 being monitored are compared against the taxon threshold of each of the taxon to which the observed access requests or requests of the sample belong. Based upon such comparison, a notification or multiple different notifications may be output.

As indicated by block 304, a monitor, such as monitor 30, receives the values for the parameters of the sample, of the observed access requests being made to an individual data storage device 40. As indicated by decision blocks 306, 308 and 310, monitor 30 (processing unit 50 following instructions contained in memory 52) determines to which taxons the sample of the observed access request or requests belong. As indicated by decision blocks 316, 318 and 320, for each taxon to which an the sample of access requests belongs, monitor 30 compares the parameter value for the sample of access requests to the taxon threshold TT for the particular taxon T to determine if the taxon threshold has been satisfied. In decision blocks 316, 318 and 320, the "=" refers to a criteria of whether the particular taxon threshold TT has been satisfied. Satisfaction of the taxon threshold TT may occur when the parameter value for the sample of access requests equals the taxon threshold, is greater than the taxon threshold, and/or is less than the taxon threshold, depending upon the nature of the taxon threshold itself.

As indicated by blocks 326, 328 and 330 in FIG. 5, if the particular taxon threshold TT for the particular taxon T is satisfied, monitor 30 outputs a corresponding notification. In one implementation, the notifications $N_1, N_2 \ldots N_N$ output in blocks 326, 328 and 330 are different from one another due to their different associated taxons T and taxon thresholds TT.

Figure 6:
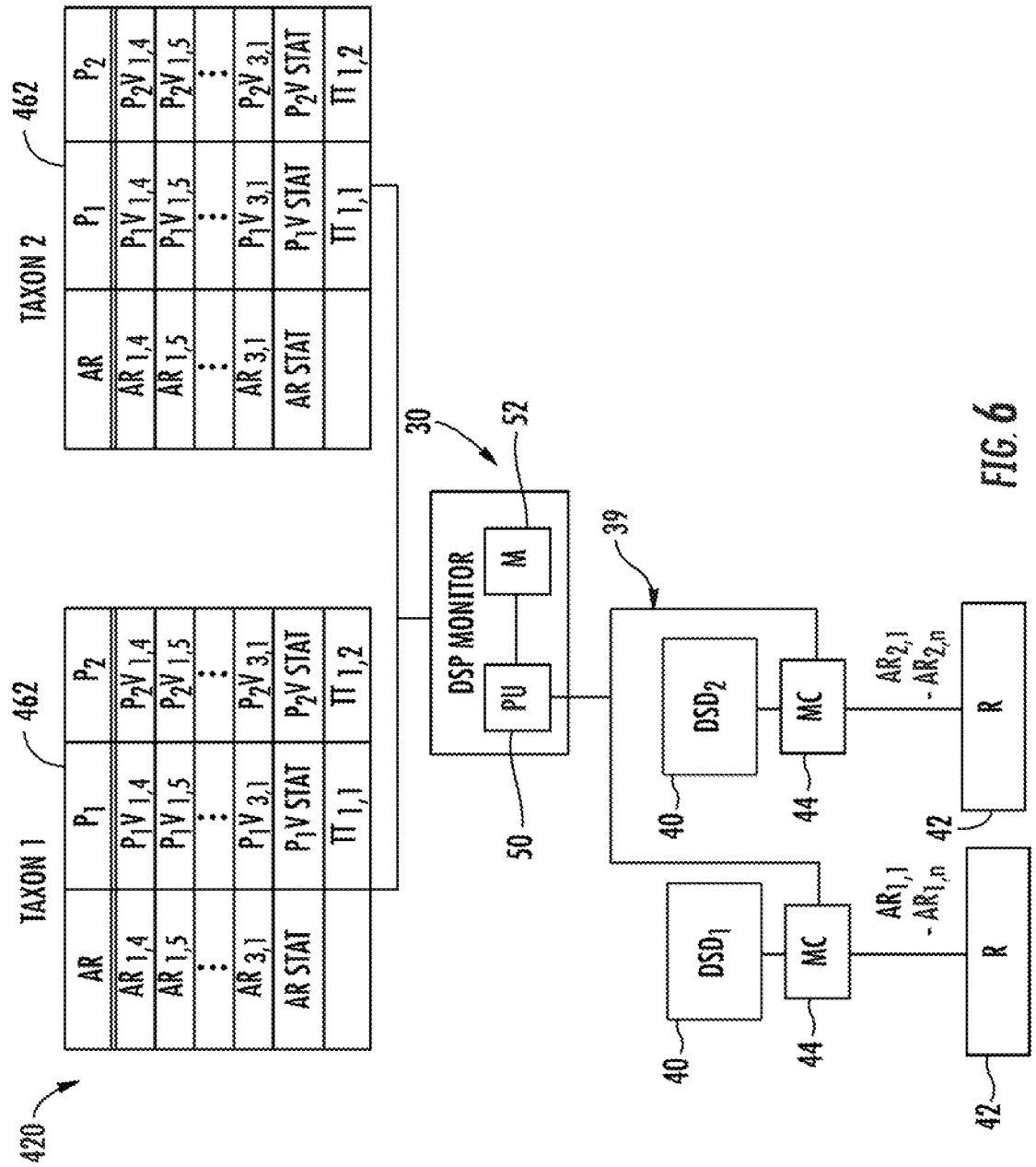
FIG. 6 is a schematic diagram of another example data storage device monitoring system.

FIG. 6 schematically illustrates data storage device monitoring system 420, an example implementation of data storage device monitoring system 20. Data storage device monitoring system 420 is similar to data storage device monitoring system 220 except that system 420 is specifically illustrated as monitoring data storage devices based upon or through the use of multiple different taxons with each taxon having multiple different thresholds based upon different parameters of the access requests belonging to the taxon. Those remaining components or elements of system 420 which correspond to components or elements of systems 20 and 220 are numbered similarly.

As shown, by FIG. 6, for each taxon 462, monitor 30 obtains multiple parameter values associated with each of the access requests belonging to the particular taxon, calculates and determines a parameter value statistic for each of the parameters ($P_1$, $P_2$) based upon the parameter values of the subset of access requests assigned to the individual taxon and determines a taxon threshold based upon the parameter value statistic as described above respect to block 112 of method 100 for each of the parameters $P_1$, $P_2$. As a result, each taxon may have multiple different taxon thresholds for multiple parameter P.

In one implementation, the parameters $P_1$ of each of taxons 262 is the same and/or the parameters $P_2$ of each of taxon 262 is the same, where the parameter values and the taxon thresholds for the different taxons 262 may still be different due to the different access requests (and their associated parameter values) assigned to the different taxons 262. In another implementation, the parameters $P_1$ of taxon 1 may be different than the parameter $P_1$ of taxon 2. Likewise, the parameter $P_2$ of taxon 1 may be different than the parameter $P_2$ of taxon 2. For example, in one implementation, parameter $P_1$ of a first taxon may comprise the quantity of data transferred to an access request while parameter P1 of the second taxon may comprise a frequency of access requests during a time period in which an individual access request was received.

The determined taxon thresholds for the different parameters $P_1$, $P_2$ of the different taxons are stored as part of a database contained in memory 52 or stored in a remotely located database. As with system 20, in one implementation, monitor 30 continuously and repeatedly updates the taxon thresholds for each taxon 462 as new access requests are made to the different data storage devices 40 across the network 39. In one implementation, the taxon threshold TT for each of taxons 462 is determined based upon access requests made at predefined time intervals are periodic time intervals, where a new determined taxon threshold TT replaces an old taxon threshold TT at each time interval. In yet another implementation, the taxon threshold TT is continuously revised in real time as new access requests are made for different data storage devices 40 and received by monitor 30. In one implementation, the $PV_{stat}$ value used as a basis for determining the taxon threshold TT is based upon a predefined set of access requests assigned to a particular taxon 462, where as new access requests are received belonging to the particular taxon 462 and are added to the predefined set used to determine the $PV_{stat}$ value, older access requests are removed or ejected from the predefined set. In one implementation, older access requests belonging to the particular taxon 462 and previously used to determine the $PV_{stat}$ value from which the taxon threshold is based, or ejected or removed from the predefined set on a first in first out basis. In other implementations, the particular access requests in their associated parameter values PV may be added to the predefined set and removed from the predefined set according to other protocols.

In one implementation, monitor 30 determines or calculates the PVstat value for each parameter P, from which the taxon threshold for the particular parameter is determined, by applying a weighting to the different parameter values PV for the different access requests AR. In one implementation, monitor 30 differently weights the parameter values PV based upon the age of the associated access request AR. For example, in one implementation, the parameter values of older access requests are given a lower weight as compared to the parameter values of newer more recently received access requests. In yet another implementation, monitor 30 may differently weight the parameter values of different access requests based upon other characteristics of the access requests such as the particular data storage device to which the access request was directed, the time of day that an access request was received, the requester from which the access request originated and/or the program or application for which the access request is being made.

Figure 7:
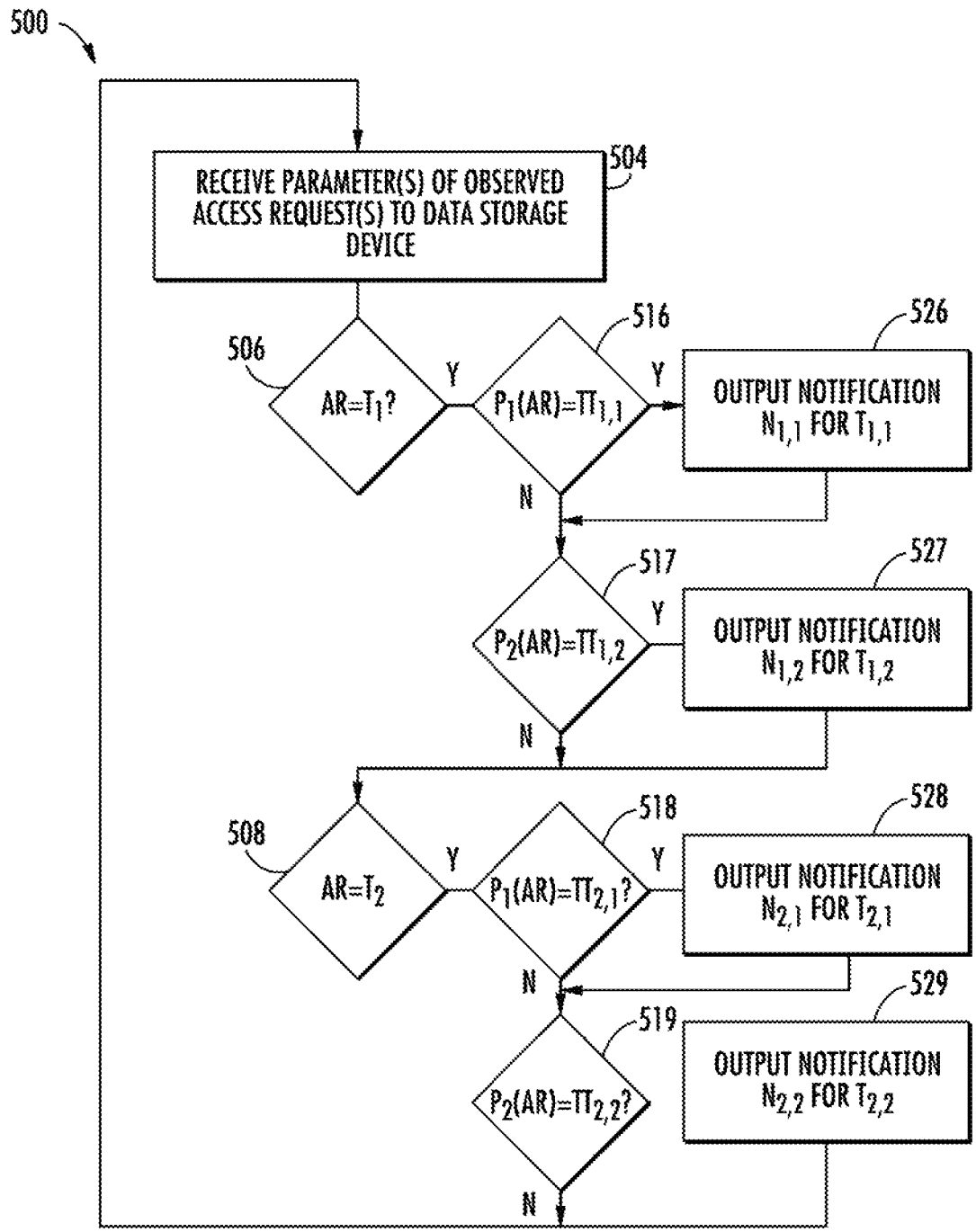
FIG. 7 is a flow diagram of another example data storage device monitoring method.

FIG. 7 illustrates an example data storage device monitoring method 500 that may be carried out by system 420. Pursuant to method 500, parameter values of a sample of observed access requests being made to a data storage device 40 being monitored are compared against the multiple taxon thresholds of each of the taxon to which the observed access requests or requests of the sample belong. The sample may comprise an individual access request or a group of access requests. Based upon such comparison, a notification or multiple different notifications may be output.

As indicated by block 504, a monitor, such as monitor 30, receives the values for the parameters of the sample of the observed access requests being made to an individual data storage device 40. As indicated by decision blocks 506, 508, monitor 30 (processing unit 50 following instructions contained in memory 52) determines to which taxons the sample of the observed access request or requests belong. As indicated by decision blocks 516, 518 for each taxon to which an the sample of access requests belongs, monitor 30 compares the parameter value P1 for the sample of access requests to the taxon threshold TT for the parameter P1 for the particular taxon T to determine if the taxon threshold $TT_{1,1}$ (the first subscript denoting the taxon ID and the second subscript denoting the parameter ID) has been satisfied (block 516) and/or whether taxon threshold $TT_{2,1}$ (the first subscript denoting the taxon ID and the second subscript denoting the parameter ID) has been satisfied (block 518). As indicated by decision blocks 517, 519 for each taxon to which an the sample of access requests belongs, monitor 30 compares the parameter value $P_2$ for the sample of access requests to the taxon threshold TT for the parameter $P_2$ for the particular taxon T to determine if the taxon threshold $TT_{1,2}$ has been satisfied (block 517) and/or whether taxon threshold $TT_{2,2}$ has been satisfied (block 519). In decision blocks 516, 517, 518 and 519, the "=" refers to a criteria of whether the particular taxon threshold TT has been satisfied. Satisfaction of the taxon threshold TT may occur when the parameter value for the sample of access requests equals the taxon threshold, is greater than the taxon threshold, and/or is less than the taxon threshold, depending upon the nature of the taxon threshold itself.

As indicated by blocks 526, 527, 528 and 529, in FIG. 7, if the particular taxon threshold TT for the particular parameter P of the particular taxon T is satisfied, monitor 30 outputs a corresponding notification $N_{x,y}$, where the first subscript x denotes the taxon ID and the second subscript y denotes the parameter ID. In one implementation, the notifications $N_{x,y}$ output in blocks 526, 527, 528 and 529 are different from one another due to their different associated taxons T, different parameters P and associated taxon thresholds.

Figure 8:
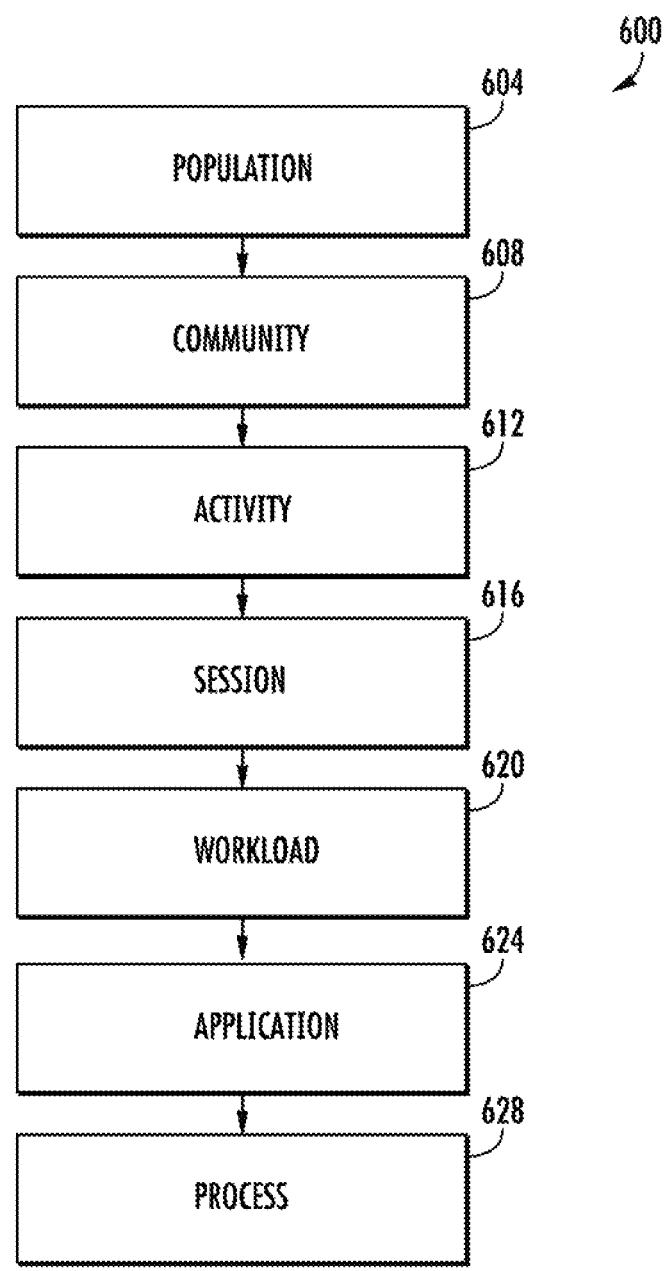
FIG. 8 is a diagram of n example taxonomy of taxons.

FIG. 8 is a diagram of an example hierarchy or taxonomy 600 of taxons for use by any of systems 20, 220 and 420 described above and any of methods 100, 300 and 500 described above. Taxonomy 600 comprises taxons comprising, in their hierarchal order: population taxon 604, community taxon 608, activity taxon 612, session taxon 616, workload taxon 620 application taxon 624 and process taxon 628. Each taxon comprises any or all of the characteristics of those taxonomies below it. Population taxon 604 comprises the entire population of access requests AR made to an entire population of data storage devices 40 having the same or similar storage device.

Community taxon 608 comprises a subset, of the population taxon 604 of access requests AR. Community taxon 608 comprises those access requests made to devices of the population that are participating in a similar activity or similar activities. Examples of such similar activities include, but are not limited to, clustered processing of the same or similar data sets within the same allotment of time (such as a CGI rendering farm, clustered data analysis, clustered computational compute (genome research) clustered automation, such as automated testing. In addition, a community may also comprise characteristic differences between session taxonomies, such as a secretarial pool in one geography versus another, corporate finance accounting vs. line of business accounting, CAD operations vs. software development and the like.

Activity taxon 612 comprises a subset of the access requests of community 608. Activity taxon 612 comprises those access requests AR made to access requests of the community taxon 608 that are executing similar sessions. Examples of sessions include, but are not limited to, similar workflows over a period of time, such as grouping of activities by end user type and job function (secretarial tasks vs, accountancy tasks vs. engineering tasks).

Session taxon 616 comprises a subset of the access requests of activity taxon 612. Session taxon 616 comprises those access requests of activity taxon 612 that are made during a range of time or similar time period when workloads are being performed. For example, access requests made to the data storage devices having similar or the same storage device characteristics, having the characteristics of a similarity in data type, size of data set, process or transformation of that data, and computational time may be assigned by monitor 30 to session taxon 616.

Workload taxon 620 comprises a subset of those access requests of session taxon 616. Workload taxon 620 comprises those access requests of session taxon 612 carrying out a particular workload. Workload may be made up of an application or multiple applications. Examples of characteristics defining the workload taxon 620 include, but are not limited to, common tasks involving the same data set or common data process flow with disparate data sources, such as compilation of source code, processing bulk data, data transformations.

Application taxon 624 comprise a subset of those access requests of workload taxon 620. Application taxon 624 comprises those access requests of workload taxon 620 that are associated with the same single application. Examples of an application taxon 624 include, but are not limited to, different sets of tasks such as a workflow of a given data set, such as accessing a database, visualizing data, word processing, mathematical calculations within a spreadsheet, editing video or audio.

Process taxon 628 comprises a subset of those access requests of application taxon 624. Process taxon 628 comprises those access requests (individual work units or individual access requests such as individual input/output operations) of application taxon 624 that are associated with a particular process being carried out as part of the application of application taxon 624. Examples of process taxon 628 include, but are not limited to, the execution of a particular computer process within an operating system. Examples of such processes comprise a process pursuant to a service or daemon, an executable file, or a device driver.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", third" and so on in the claims merely distinguish different elements and, unless otherwise stated, are not to be specifically associated with a particular order or particular numbering of elements in the disclosure.

What is claimed is:

1. A method for monitoring different data storage devices across a network, the method comprising:
   receiving data storage access requests made to the different data storage devices across a network;
   assigning a subset of the access requests to a taxon of a taxonomy of access request characteristics;
   for the taxon, determining a taxon threshold for a parameter based upon the subset of the access requests;
   comparing the parameter of a sample of observed access requests, made to a data storage device and belonging to the taxon, to the taxon threshold; and
   outputting a notification regarding the data storage device based upon the comparison, where the taxon is selected from a group of taxons consisting of: population, community, activity, session, workload, application and process, wherein the population taxon comprises requests made to a same type of storage device, wherein the community taxon comprises access requests made to storage devices that are participating in a same type of activity, wherein the activity taxon comprises access requests that are executing same types of sessions, wherein the session taxon comprises access requests that are performed during same ranges of time, wherein the workload taxon comprises-access requests carrying out a particular workload, wherein the application taxon comprises access requests of the application taxon associated with a same single application and wherein the process taxon comprises access requests that are associated with a particular process being carried out as part of the application.

2. The method of claim 1, where the parameter comprises a frequency of receipt of access requests for a time period.

3. The method of claim 1, where the parameter comprises a quantity of transferred data based upon an amount of data to be transferred pursuant to the access requests.

4. The method of claim 1 where receiving the data storage access requests from the different data storage devices comprises receiving a real time network stream of access requests from the different data storage devices, and where the taxon threshold for the taxon is automatically periodically updated based upon the subset of the access requests of the network stream of the access requests for the different data storage devices across the network.

5. The method of claim 4, where the subset of the access requests of the network stream is automatically updated based on a first in-first-out basis.

6. The method of claim 4, where the sample of observed access requests for the storage device that is compared to the taxon threshold comprise a subset of access requests received in real time as a device stream.

7. The method of claim 6, where the subset of access requests of the device stream is automatically updated based on a first in-first-out basis.

8. The method of claim 1 further comprising determining a second taxon threshold based upon the subset of the access requests belonging to the taxon, where the notification comprises a first notification type in response to the taxon threshold being satisfied and a second notification type, different than the first notification type, in response to the second taxon threshold being satisfied.

9. The method of claim 1, where the notification indicates an expected failure of the data storage device of the different data storage devices.

10. The method of claim 1, wherein the taxonomy comprises a population taxon, a community taxon, and activity taxon, a session taxon, workload taxon, and application taxon and a process taxon, in hierarchical order.

11. The method of claim 1, wherein the taxon consists of access requests made to storage devices that are participating in a same type of similar activity.

12. A data storage device monitoring system comprising:
   a database storing a taxon threshold for an access request parameter for a taxon of a taxonomy of characteristics of access requests made to different data storage devices on a network; and
   a data storage device monitor to:
   receive the access requests made to the different data storage devices across a network;
   automatically update the taxon threshold as the received access requests are received based upon received access requests belonging to the taxon;
   compare the parameter of a sample of observed access requests, made to a data storage device and belonging to the taxon, to the taxon threshold, where the parameter comprises a quantity of transferred data based upon an amount of data to be transferred pursuant to the access requests; and
   output a notification regarding the data storage device based upon the comparison.

13. The monitoring system of claim 12, where the parameter comprises a frequency of receipt of access requests for a time period.

14. A non-transitory computer-readable medium containing instructions to monitor different data storage devices across a network, the instructions to direct a processor to:
   receive data storage access requests made to the different data storage devices across the network;
   assign a subset of the access requests to a taxon of a taxonomy of access request characteristics;
   for the taxon, determine a taxon threshold for a parameter based upon the subset of access requests;
   automatically update the taxon threshold for the taxon as new access requests made to the different data storage devices across the network are received based upon newly received access requests belonging to the taxon;
   compare the parameter of a sample of observed access requests to a data storage device, belonging to the taxon, to the taxon threshold; and
   output a notification regarding the data storage device based upon the comparison, where the taxon is selected from a group of taxons consisting of: population, community, activity, session, workload, application and process, wherein the population taxon comprises requests made to a same type of storage device, wherein the community taxon comprises access requests made to storage devices that are participating in a same type of activity, wherein the activity taxon comprises access requests that are executing same types of sessions, wherein the session taxon comprises access requests that are performed during same ranges of time, wherein the workload taxon comprises-access requests carrying out a particular workload, wherein the application taxon comprises access requests of the application taxon associated with a same single application and wherein the process taxon comprises access requests that are associated with a particular process being carried out as part of the application.

15. The monitoring system of claim 12, wherein the data storage device is to further determine a second taxon threshold based upon the subset of the access requests belonging to the taxon, where the notification comprises a first notification type in response to the taxon threshold being satisfied and a second notification type, different than the first notification type, in response to the second taxon threshold being satisfied.

16. The non-transitory computer-readable medium of claim 14, wherein the instructions further direct the processor to determine a second taxon threshold based upon the subset of the access requests belonging to the taxon, where the notification comprises a first notification type in response to the taxon threshold being satisfied and a second notification type, different than the first notification type, in response to the second taxon threshold being satisfied.

* * * * *